Figure 1:
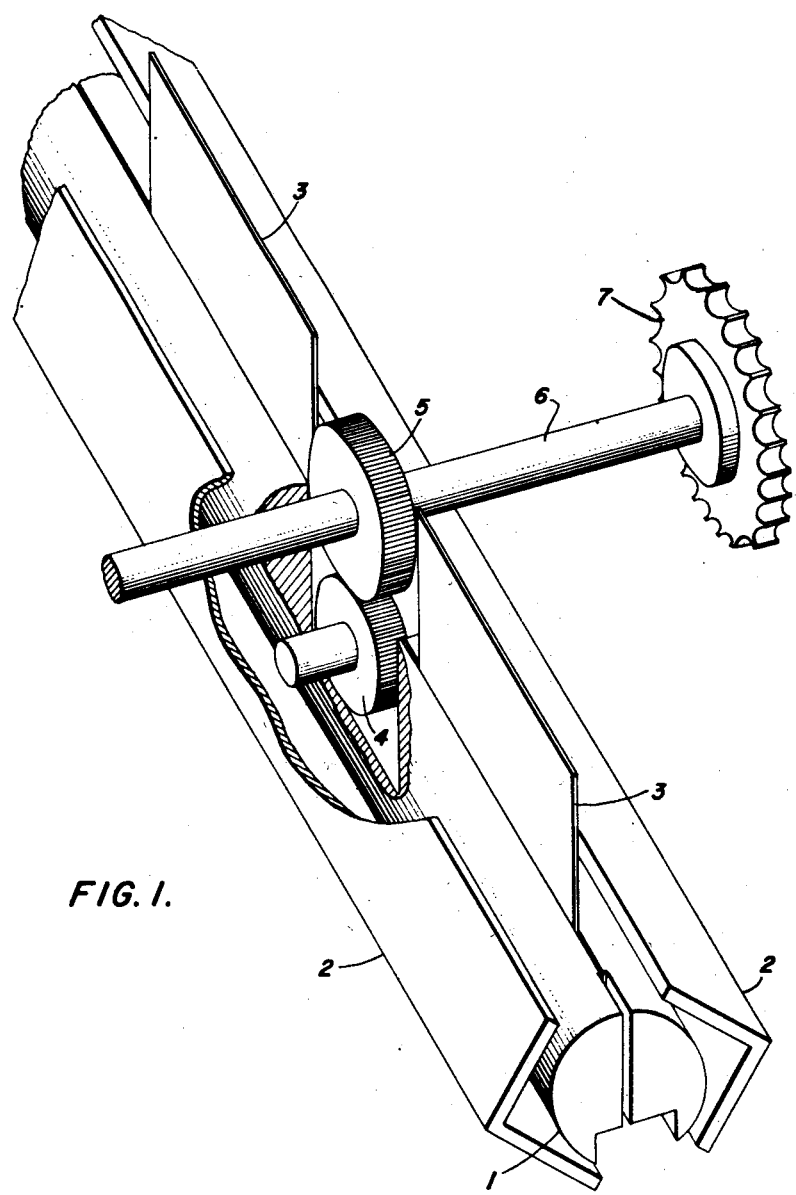

Oct. 24, 1950     L. J. BERKELEY     2,526,723
CONTINUOUS LONGITUDINAL SEAM WELDER
Filed Dec. 28, 1944     4 Sheets-Sheet 1

Inventor
LAURENCE J. BERKELEY
By
Attorneys

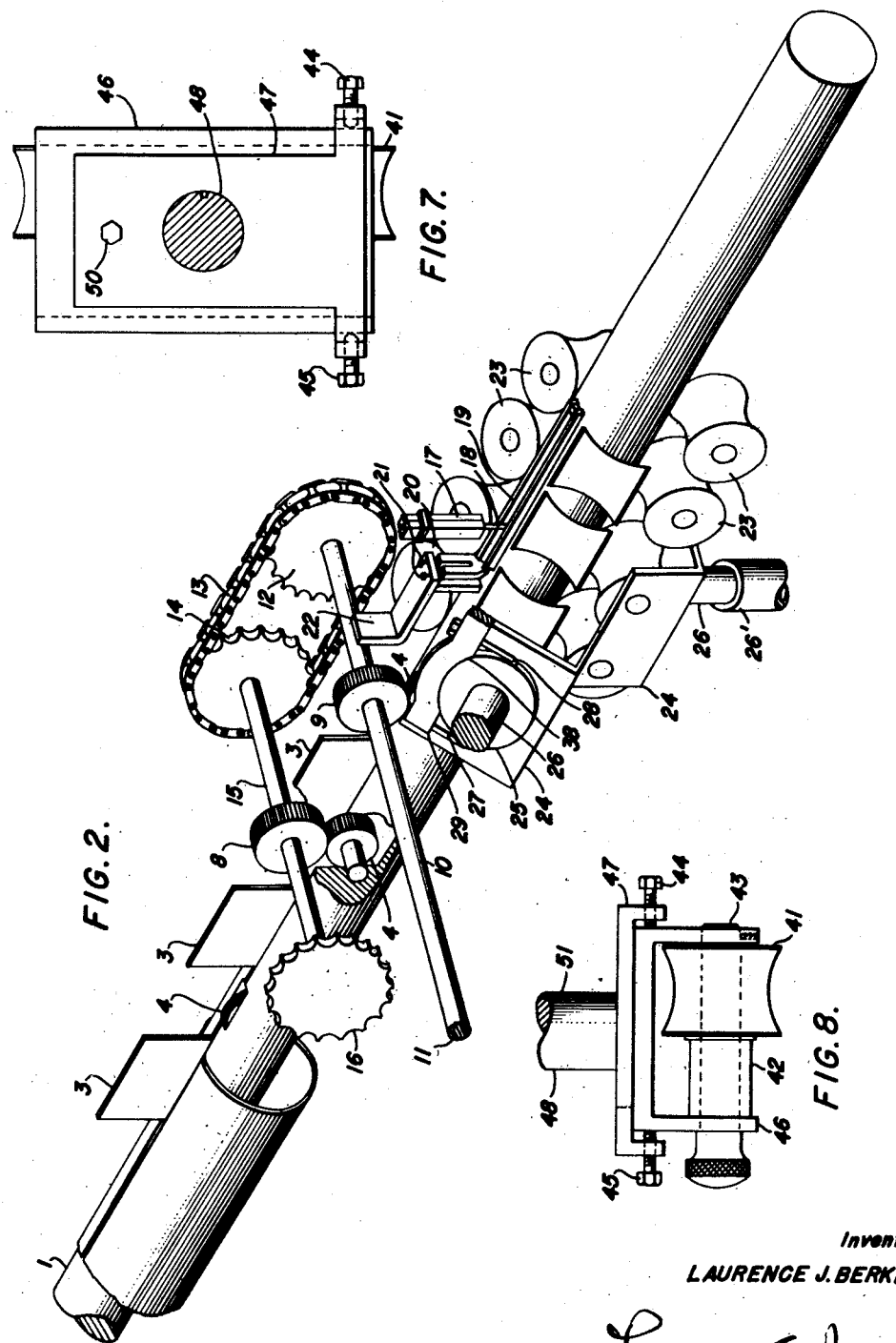

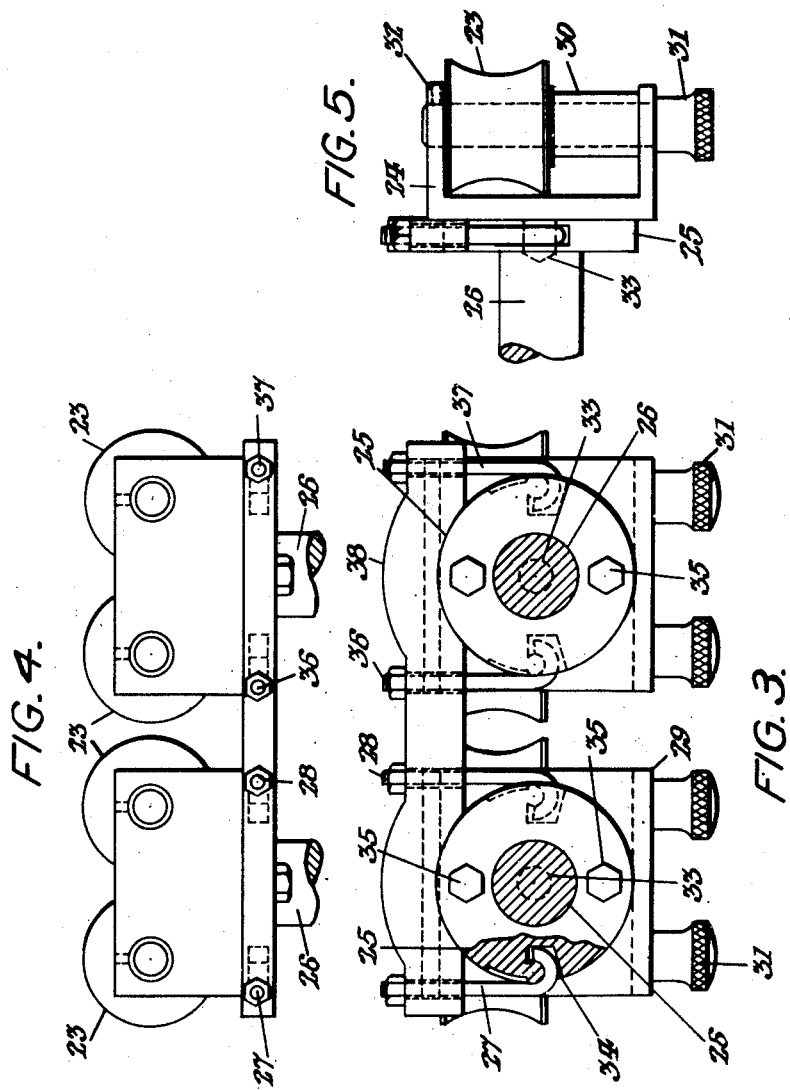

Patented Oct. 24, 1950

2,526,723

UNITED STATES PATENT OFFICE 2,526,723

CONTINUOUS LONGITUDINAL SEAM WELDER

Laurence J. Berkeley, Danville, Ill.

Application December 28, 1944, Serial No. 570,088

3 Claims. (Cl. 113—59)

This invention relates to a machine for the continuous welding of articles and particularly to the electric welding of the longitudinal seam of articles, such as pipes.

Among the objects of the invention is to provide an apparatus for continuously welding the longitudinal seam of tubular sections formed from sheet metal.

Another object of the invention is to provide a novel method and means for feeding formed sections successively past the welding means.

A major object of my machine is to provide a method for the continuous seam welding of tubular objects.

An important advantage of my machine is that I provide a means for making a uniform weld at speeds which were heretofore thought impossible.

Another important object of the invention is to feed the articles past the welding means in continuous and abutting relationship, whereby the seams are welded as if the tubular sections were all one piece.

Another object of the invention is to provide an improved mandrel having associated therewith power moving means for moving the tubular sections past the welding means.

Another important object of the invention is to provide an improved flux trough for submerged arc welding and having associated therewith means for exerting pressure in a vertical direction on the work piece in order to always insure the proper closing of the seam for the welding operation.

An important object of the invention is to provide a pressure work engaging means for maintaining the seam in proper alignment as the work passes the welding means and also to close the seam and primarily to close the seam in a lateral direction.

A further important object of my invention is to provide coacting but independent work engaging pressure means which will close the seam properly for welding by exerting pressure on the work piece in both a vertical and horizontal or lateral direction.

My invention, among other things, is especially adapted for the automatic and continuous seam welding of tubular sections formed from sheet metal. In the formation of such sections which leave an open longitudinal seam which must be welded to form a final closed section, imperfections in the forming frequently, and one might say, almost invariably, occur. The type of imperfection may vary from plant to plant, machine to machine, and even vary for different operators handling the section forming apparatus. Such imperfections may result in a pipe or section which is not concentric, a pipe in which one of the edges next to the seam may extend considerably above the other edge of the seam, a pipe which may have imperfections such as flat spots or fluting, which, when forced through a pressure means engaging the work piece results in a tendency for the pipe to spiral as it passes past or under the welding means, resulting in an imperfect welding operation. It is therefore an important object of my invention to provide means for adjusting the feeding and aligning mechanism to take care of such imperfectly formed pipe in order to have a commercially satisfactory and uniform weld.

While my apparatus is advantageous and provides a novel manner of continuously welding the longitudinal seams of tubular sections perfectly formed, I also provide a novel means for accomplishing a result which has heretofore not been solved in a practical or commercial manner and that is the welding of a uniform and satisfactory seam even though the pipe or section is imperfectly formed. My apparatus provides (1) a means for preventing the tendency of imperfectly formed pipe to spiral as it passes under the welding means, and (2) maintains the seam in alignment with respect to the welding means, (3) closes the seam to obtain a proper weld by providing in combination pressure exerting means in both a lateral and a vertical direction, and (4) means for changing the direction of exertion of such pressure for maintaining the alignment even for improperly formed pipe.

In general, my device involves a mandrel in the form of a billet in which are journalled rolls, preferably idler rolls and which preferably extend slightly above the surface of the billet. A number of mandrel supports, serving as separators and seam aligners, hereafter referred to as splitters, are rigidly mounted in the mandrel in a plane common to the idler rolls and are preferably alternated with the idler rolls. Power driven rolls are spaced from but coact with said idler rolls whereby the separate tubular sections are fed in abutting relationship to the welding means. The splitters accurately align the seam up to a point near the welding means. By my apparatus, I am able to maintain this alignment by using pressure rollers spaced about the work piece. The pressure work engaging rollers are preferably idler rollers and not only maintain the alignment of the seam but also close the seam primarily in a lateral direction in order to obtain a proper and uniform weld.

The tendency of the tubular sections fed to the apparatus to spiral as they pass under the welding means can be corrected by the provision of adjustable means, attached to the pressure work engaging rollers, for changing the angularity of rotation with respect to the direction of movement of the tubular sections past the welding means, thereby maintaining the seam in alignment. For example, for a perfectly formed tubular section, the axis of rotation of all the rollers would be transverse to the direction of movement of the tubular section past the welding means. However, if the tubular section should tend to spiral in a clockwise direction, the angle of rotation of the rollers can be changed in a counterclockwise direction to offset the moment of force created by the spiraling tendency and the alignment of the seam would be maintained. Furthermore, I provide an independent work engaging means coacting with the pressure rollers for exerting pressure adjacent to the welding means in a vertical direction so that if either edge of the tubular section extends above the other edge, I can adjust this independent vertical pressure means to force the two edges together, thereby closing the seam in a vertical direction. It is frequently necessary to make both adjustments in order to properly close and maintain the seam in alignment for welding, although many times only one of the adjustments will have to be made.

While my apparatus is designed to permit these independent adjustments to be made during the welding operation, this is usually not necessary. Prefabricated tubular sections to be welded coming from the same machine, within a reasonable length of time and made of the same material, usually are uniform in the sense that they are uniformly good or that the imperfections are uniformly alike. Therefore, in practice, it is usually sufficient, for each lot or batch of pipe sections to be welded, to properly adjust my device for the first few tubular sections.

I also provide a novel flux trough for use in submerged arc welding, and I provide a novel manner of directly associating with the flux trough the independent pressure means above described for exerting, cooperatively with the pressure rolls, the vertical pressure on the tubular sections in order to insure the proper closing of the seams.

Figure 6:
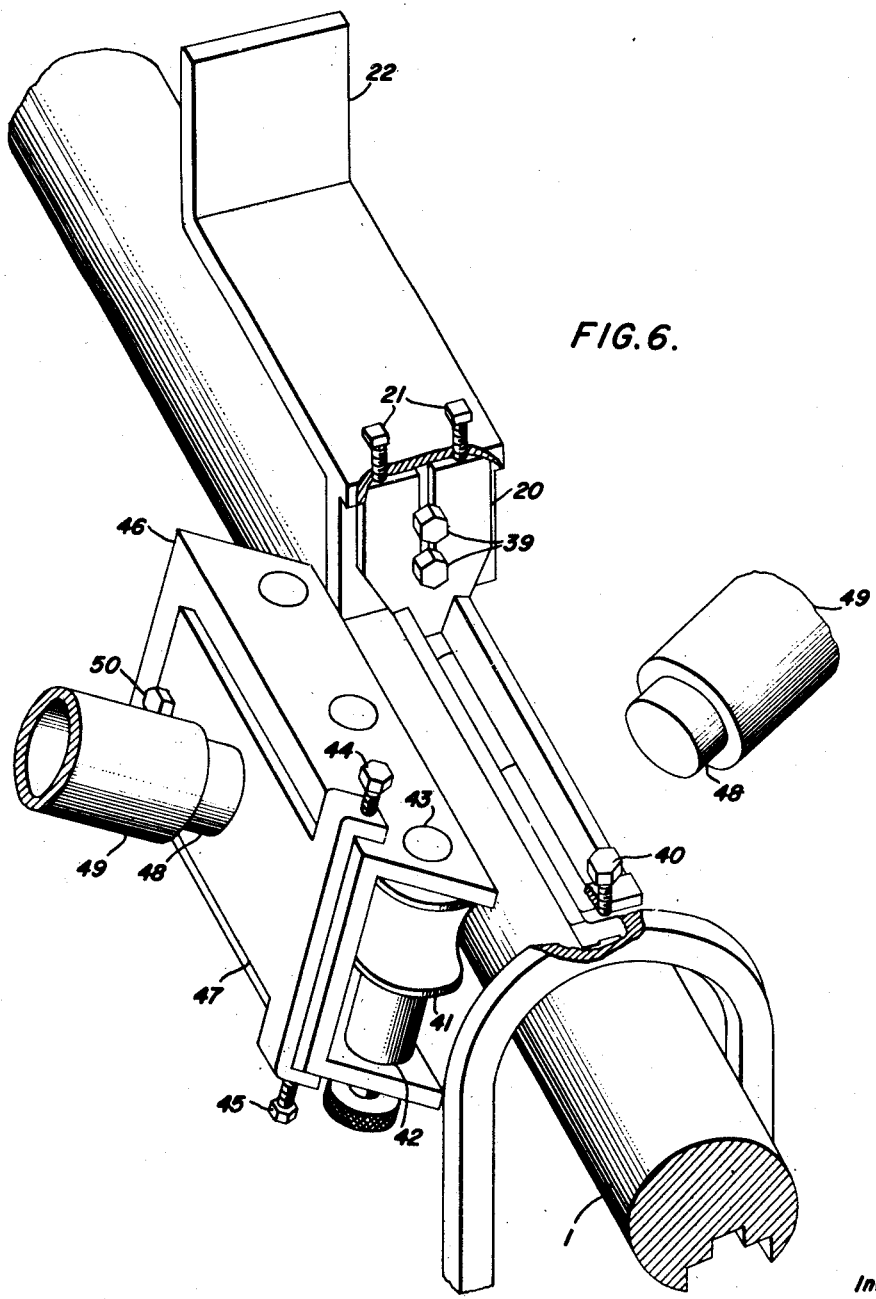

Other objects, advantages, and uses of my invention will become apparent by referring to the drawings in which Fig. 1 is a perspective view of the feed end of the apparatus. Fig. 2 is a perspective view of the welding end of the apparatus. Fig. 3 is an elevation and partial cross-section, Fig. 4 is a plan view, and Fig. 5 is an end view of the pressure rollers shown in Fig. 2 illustrating the means for adjusting the angularity of rotation of the pressure rolls. Fig. 6 is a perspective view illustrating in more detail the flux trough shown in Fig. 2 and another type of pressure rolls which may be used in my device. Fig. 7 is an elevation view and partial cross-section, and Fig. 8 is an end view of the pressure rolls shown in Fig. 6 illustrating another means for changing or adjusting the angularity of the pressure rolls.

Referring to Fig. 1, the preformed tubular section to be welded is placed on the mandrel 1 and guided by the shoes 2 to the first mandrel support 3. The mandrel supports not only serve as separators for the seam but also for guiding and aligning the seam and are referred to herein as splitters. The mandrel 1 is provided with idler rollers 4 journaled therein so as to rotate when the work piece passes over them. The splitters 3 are fixedly attached to the mandrel 1 and support the mandrel by being fastened to the main frame of the machine assembly. A power driven knurled roller 5 attached to the rotatable shaft 6 is spaced from and coacts with an idler roller 4 to feed the work along the mandrel toward the welding means. A sprocket 7 attached to the shaft 6 engages a chain drive (not shown). While I have described a sprocket and chain drive, it is understood that other suitable power means may be used to rotate the shaft 6 and the knurled roller 5. Figs. 1 and 2 illustrate in perspective the essential parts of my complete machine. As the tubular sections are moved along the mandrel toward the welding means by the power driven rollers 5, the open seams of the tubular sections are maintained in alignment by the splitters 3.

Referring to Fig. 2, additional idler rollers 4 and power driven knurled rollers 8 and 9 are provided for continuously moving the tubular sections along the mandrel. To obtain the best results the splitters are positioned in between the idler rollers 4, and thus I provide a novel method for feeding the pipe sections in proper seam alignment. The splitters 3 and the idler rollers 4 are positioned in the mandrel in a common plane. It is also preferable to have the idler rollers 4 extended slightly above the surface of the billet 1. I have also found it desirable in some cases to have the splitters 3 thicker at the feed end than those near the welding means. By such arrangement, I initially spread the seam of the pipe sections properly for guiding them along the mandrel and then the thinner splitters permit the seam to close somewhat thereby relieving some of the work required by the pressure rolls.

The knurled roller 9 is attached to the shaft 10 and the end 11 of the shaft 10 may be rotated by any suitable power means (not shown). Sprocket 12 at the other end of the shaft 10 engages chain 13, which in turn engages sprocket 14, providing a means for rotating shaft 15 to which is attached the power driven roller 8. Similarly, sprocket 16 may engage a chain similar to chain 13 to drive the next knurled roller (which is not illustrated), thereby enabling one power means to rotate all of the knurled rollers.

I find it desirable to rotate at least one of the power driven rollers, for example knurled roller 5, at a greater number of revolutions per minute than the other knurled rollers so that the tubular sections will be fed along the mandrel initially at a faster rate. Such increasing of the rate of rotation of the knurled roller 5 assures that the tubular sections will be moved past the welding means in abutting relationship. This is essential as there must be no gap between the sections as they pass the welding means. With the various pipe sections in abutting relationship as they pass the welding means, the seams are welded as if they were all one piece.

Several means within the scope of my invention may be used to feed the tubular sections in abutting relationship. If one power means at point 11 is used as a means for rotating all of the power driven rollers, sprocket 7 is made smaller than sprocket 14, rotating the roller 5 at a faster rate than the roller 8; or the roller 5 may be larger in diameter than the roller 8, serving to feed the tubular sections at a faster rate at that point. Another method is to provide a separate power means engaging sprocket 7 for rotating roller 5 at a faster rate than rollers 8 and 9.

A suitable conventional welding head 17 is provided for holding the welding rod 18. The means for continuously feeding the welding rod for the electric arc welding is not illustrated since any well-known means may be employed.

A flux trough 19 is provided for use in what is called submerged arc welding. Conventional means are employed for continuously feeding the flux to the flux trough. It is, of course, understood that a suitable copper shoe is positioned in the mandrel underneath the flux trough under the point of welding and also that suitable cooling means must be supplied at that point, but they are not illustrated since they form no part of my invention. A U-shaped member 20 is connected to the flux trough so that by turning the screws 21 threaded in the support plate member 22, pressure may be exerted on the tubular section in a vertical direction in order to close the seam if one edge of the tubular section should extend above the other edge. By turning either one of the screws 21, the flux trough at that end may be twisted slightly to accomplish such closing of the seam. This will be more fully explained in connection with the description of Fig. 6.

A plurality of pressure work engaging idler rolls 23 are positioned around the mandrel to maintain the alignment of the seam past the welding means and to exert a pressure primarily in a lateral direction for closing the seam to obtain the proper weld. The sleeve 26' is adjustably attached to the main frame of the welding assembly, and suitable means are provided for exerting proper pressure on the pressure rolls 23 engaging the tubular sections as they pass under the welding means and thereby closing the seam primarily in a lateral direction. The pressure rolls 23 underneath the mandrel cooperate with the pressure means 20 for closing the seam in a vertical direction.

As explained previously, the splitters maintain the alignment of the seams up to the point of welding but then they lose control. It is therefore necessary to provide means for maintaining the alignment during the welding and this is accomplished by my novel method of adjusting the angularity of rotation of the pressure rolls 23. Pressure rolls 23 and assembly plates 24 and 25 are attached and keyed to the shaft 26 in order that the shaft 26 journaled in sleeve 26' may be rotated slightly either in a clockwise or counter-clockwise direction by adjusting one of the hook bolts 27 or 28 threaded in the yoke 29. By adjusting the hook bolts 27 and 28, the angularity of rotation of the pressure rolls may be adjusted. For a perfectly formed section the axes of the rolls remain transverse to the longitudinal dimension of the mandrel or transverse to the direction of movement of the tubular sections past the welding means. However, an imperfectly formed fluted tubular section tends to spiral as it is forced along the mandrel past the welding means and this can be corrected by adjusting the hook bolts 27 and 28 to counteract the moment of force created by the spiraling, thereby maintaining the seam alignment required for a proper weld.

The means shown in Fig. 2 for adjusting the angularity of rotation of the pressure rolls 23 is best described by referring to Figs. 3, 4, and 5. Referring to Fig. 5, the roller 23 and the sleeve 30 are arranged to freely rotate about the shaft 31 as the tubular section passes underneath that pressure roller. The shaft 31 is keyed to the block assembly 24 by means of the set screw 32. This also provides a convenient way for inserting different sized rollers 23 in the block assembly 24 for different size tubular sections. The plate 25 and the shaft 26 are keyed to the assembly block 24 at 33.

Referring to Figs. 3 and 4, the hook bolt 27 is inserted in the slot 34 of the plate 25. The plate 25 is attached to the assembly block 24 by stud bolts 35. A yoke 38 freely rests upon plates 25 and is fastened to the roller assembly only by the hook bolts 27, 28, 36, and 37. Thus, if it is desired to change the angularity of rotation of the four pressure rolls shown in Figs. 3, 4, and 5 in a clockwise direction, the nuts attached to hook bolts 27 and 36 are tightened and the nuts attached to hook bolts 28 and 37 are loosened rotating the entire assembly using the yoke 38 as a stationary fulcrum.

The pressure work engaging rolls serve three functions:

1. The closing of the seams in a lateral direction.

2. By proper adjustment, the angularity of rotation of the rolls can be adjusted to keep the seam in alignment as it passes under the welding means.

3. The pressure rolls 23 coact with the pressure exerting member 20 attached to the flux trough for closing the seam in a vertical direction.

Fig. 6 illustrates in more detail the flux trough and also illustrates another arrangement of the pressure rolls whereby their angularity of rotation in respect to the movement of the tubular section past the welding means may be changed. The U-shaped vertical pressure work engaging member 20 engages the bolts 21 threaded in frame 22. Thus, by adjusting the bolts 21 the sections may be closed in a vertical direction in case one edge of the section should extend above the other edge. Bolts 39 attach member 20 to the frame 22. By adjusting the pressure exerted by the screw bolt 40, the seam of the pipe section is further maintained in proper alignment.

Pressure rolls 41, similar to the pressure rolls 23 of Fig. 2, are arranged so that the rolls and the sleeves 42 are free to rotate about the shaft 43. The shaft 43 is journaled in the block assembly 46. A plate 47 is pivotedly attached to the block assembly 46 at point 50. In this arrangement, the shaft 48 attached to the sleeve 49 does not rotate and the angularity of rotation of the pressure rolls is changed by adjusting the bolts 44 and 45 threaded in the plate 47 and bearing on the parallel surfaces of the block assembly 46. This is best shown by referring to Figs. 7 and 8. The shaft 48 is keyed at 51 to the plate 47. Both the shaft 48 and the plate 47 remain stationary and by adjusting the screws 44 and 45, the angularity of rotation of the pressure rolls 41 may be changed. The pressure rolls illustrated in Figs. 6, 7, and 8 are usually used in connection with relatively small pipe while the pressure rolls illustrated in Figs. 2, 3, 4, and 5 are preferably used in connection with relatively large pipe.

It is obvious that various modifications may be made in my invention without departing from the essential features thereof as defined in the appended claims, and, therefore, I do not desire to limit myself to the precise details of construction and arrangement herein set forth.

I claim as my invention:

1. In an apparatus for the continuous longitudinal seam welding of pipe, the combination of welding means at the output end of said apparatus, a mandrel, means for closing and maintaining the alignment of said seam in order to properly weld the seam at said welding means, pressure rolls disposed about said mandrel adjacent said welding means to close said seam in a lateral direction, means for adjusting the angularity of rotation of said pressure rolls with respect to the longitudinal axis of the pipe to maintain the alignment of said seam while welding, pressure means adjacent to said welding means for closing the seam in a vertical direction, said pressure means being independent from but coacting with said pressure rolls.

2. In apparatus for continuously welding the longitudinal seams of tubular articles; the combination of welding means at the output end of said apparatus; means for moving said tubular articles through said apparatus and past said welding means; a series of pressure rolls, the axes of rotation of which normally are in planes substantially at right angles to the longitudinal axis of the tubular articles, defining a welding throat adjacent said welding means, said pressure rolls being adapted to close the longitudinal seam of said tubular articles as said seam is moved past said welding means; and means for selectively angularly adjusting the axis of rotation of some of said pressure rolls with respect to the longitudinal axis of the tubular articles; whereby, spiralling of said tubular articles is prevented and the seam of said tubular articles is maintained in proper welding position with respect to said welding means.

3. In an apparatus for continuously welding the longitudinal seams of tubular sections; the combination of welding means; a mandrel; power driven means for moving said pipe sections in abutting relationship along said mandrel toward said welding means; means for guiding and aligning said seam for welding as it approaches said welding means, including splitters connected to said mandrel; pressure rolls disposed about said mandrel adjacent said welding means to close said seam in a lateral direction; means for angularly adjusting the axis of rotation of some of said pressure rolls with respect to the longitudinal axis of the tubular articles; and pressure means adjacent to said welding means for closing the seam in a vertical direction, said pressure means being separate from but coacting with said pressure rolls.

LAURENCE J. BERKELEY.

REFERENCES CITED

The following references are of record in the file of this patent:

UNITED STATES PATENTS

| Number | Name | Date |
|---|---|---|
| 1,388,434 | Johnston | Aug. 23, 1921 |
| 1,434,918 | Shaw et al. | Nov. 7, 1922 |
| 1,808,261 | Sessions | June 2, 1931 |
| 1,997,272 | Adams | Apr. 9, 1935 |
| 2,009,501 | Kurtze | July 30, 1935 |
| 2,043,020 | Thiemer | June 2, 1936 |
| 2,105,079 | Holslag | Jan. 11, 1938 |
| 2,150,202 | Blevins | Mar. 14, 1939 |
| 2,153,785 | Williams | Apr. 11, 1939 |
| 2,196,106 | Darner | Apr. 2, 1940 |
| 2,205,681 | Caputo | June 25, 1940 |
| 2,417,594 | Fleche | Mar. 18, 1947 |